US010556750B2

(12) United States Patent
Hershkovitz et al.

(10) Patent No.: US 10,556,750 B2
(45) Date of Patent: Feb. 11, 2020

(54) SENSING AN ARTICLE IN A CONVEYOR

(71) Applicant: HP INDIGO B.V., Amstelveen (NL)

(72) Inventors: Lior Hershkovitz, Ness Ziona (IL); Shai Druckman, Ness Ziona (IL); Ofer Ben Bassat, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/748,570

(22) PCT Filed: Oct. 22, 2015

(86) PCT No.: PCT/EP2015/074553
§ 371 (c)(1),
(2) Date: Jan. 29, 2018

(87) PCT Pub. No.: WO2017/067600
PCT Pub. Date: Apr. 27, 2017

(65) Prior Publication Data
US 2018/0222680 A1  Aug. 9, 2018

(51) Int. Cl.
*B65G 43/08* (2006.01)
*B65G 21/20* (2006.01)

(52) U.S. Cl.
CPC ......... *B65G 21/2036* (2013.01); *B65G 43/08* (2013.01); *B65G 2201/02* (2013.01); *B65G 2201/04* (2013.01)

(58) Field of Classification Search
CPC .................... B65G 43/08; B65G 21/2036
USPC ........ 198/471.1, 502.3, 688.1, 689.1, 810.03
See application file for complete search history.

(56) References Cited

U.S. PATENT DOCUMENTS

| 4,792,249 A | 12/1988 | Lahr |
| 5,240,102 A * | 8/1993 | Lucas ..................... B65G 13/10 198/456 |
| 5,317,127 A | 5/1994 | Brewster, Jr. et al. |
| 5,553,536 A | 9/1996 | Van Os |
| 5,934,167 A | 8/1999 | Yamamoto |
| 6,456,310 B1 | 9/2002 | Wallace et al. |
| 6,572,520 B2 | 6/2003 | Blumle |
| 6,964,468 B2 * | 11/2005 | Kitahara .................. B41J 2/155 347/105 |
| 7,027,076 B2 * | 4/2006 | Ruiz ..................... B41J 13/0009 347/190 |
| 7,237,670 B1 * | 7/2007 | Ryan ...................... B65G 17/24 198/370.09 |

(Continued)

FOREIGN PATENT DOCUMENTS

| CN | 1776884 | 5/2006 |
| JP | S5869608 A | 4/1983 |
| JP | H0782697 A | 3/1995 |

OTHER PUBLICATIONS

US 2018/0280241 A1, Okabe, Oct. 4 (Year: 2018).*

*Primary Examiner* — Douglas A Hess
(74) *Attorney, Agent, or Firm* — HP Inc. Patent Department

(57) ABSTRACT

Certain examples of conveyors are described. The conveyors comprise a belt for conveying an article, wherein the belt has a plurality of holes. The conveyors further comprise sensors and the sensors and the plurality of holes are arranged such that the article is detectable when both the sensors sense a material simultaneously. Dryers, print substrate pre-treatment apparatus and printing systems are also described.

8 Claims, 13 Drawing Sheets

(56) References Cited

U.S. PATENT DOCUMENTS

| | | | | |
|---|---|---|---|---|
| 7,618,513 B2* | 11/2009 | Meyer | ............... | A61F 13/15699 |
| | | | | 156/265 |
| 8,066,282 B2* | 11/2011 | Muller | ................... | B65H 5/021 |
| | | | | 271/276 |
| 8,636,139 B2* | 1/2014 | Umezawa | ............... | B65G 15/12 |
| | | | | 198/689.1 |
| 9,114,648 B2* | 8/2015 | Tamaki | ................... | B41J 11/006 |
| 9,228,957 B2* | 1/2016 | Kujacznski | ............ | G01N 21/89 |
| 9,433,538 B2* | 9/2016 | Pagel | ................. | A61F 13/15723 |
| 9,493,307 B2* | 11/2016 | Hershfeld | ................ | B41F 17/24 |
| 9,573,766 B2* | 2/2017 | Lenser | ................... | B65G 23/06 |
| 10,358,307 B1* | 7/2019 | Liu | ........................ | B65H 5/224 |
| 2011/0016739 A1 | 1/2011 | Beck et al. | | |
| 2014/0210153 A1 | 7/2014 | Nagumo et al. | | |

\* cited by examiner

SENSING AN ARTICLE IN A CONVEYOR

BACKGROUND

Conveyor systems may comprise a conveyor belt. Many different kinds of articles may be placed on such a belt, e.g. bulk material, discrete products, continuous webs of material. These articles may be placed on the belt, generally near a first end of the belt and may be moved in a conveying direction. At an opposite end of such a belt, the articles may be manipulated further. Such manipulation may comprise the article being picked up or dropped off for further processing. Such further processing may include treatment of the articles, manufacturing processes, sorting and selecting processes, and many others.

BRIEF DESCRIPTION OF THE DRAWINGS

Some non-limiting examples of the present disclosure will be described in the following with reference to the appended drawings, in which.

DETAILED DESCRIPTION

Certain examples as described herein provide conveyors comprising a belt for moving an article along a conveying direction. The belt has a first pair of rows of holes extending along the conveying direction, and a sensor associated with each row of the first pair of rows. The sensors and the first pair of rows of holes are arranged such that the article is detectable when both the sensors sense a material simultaneously.

Figure 1A:
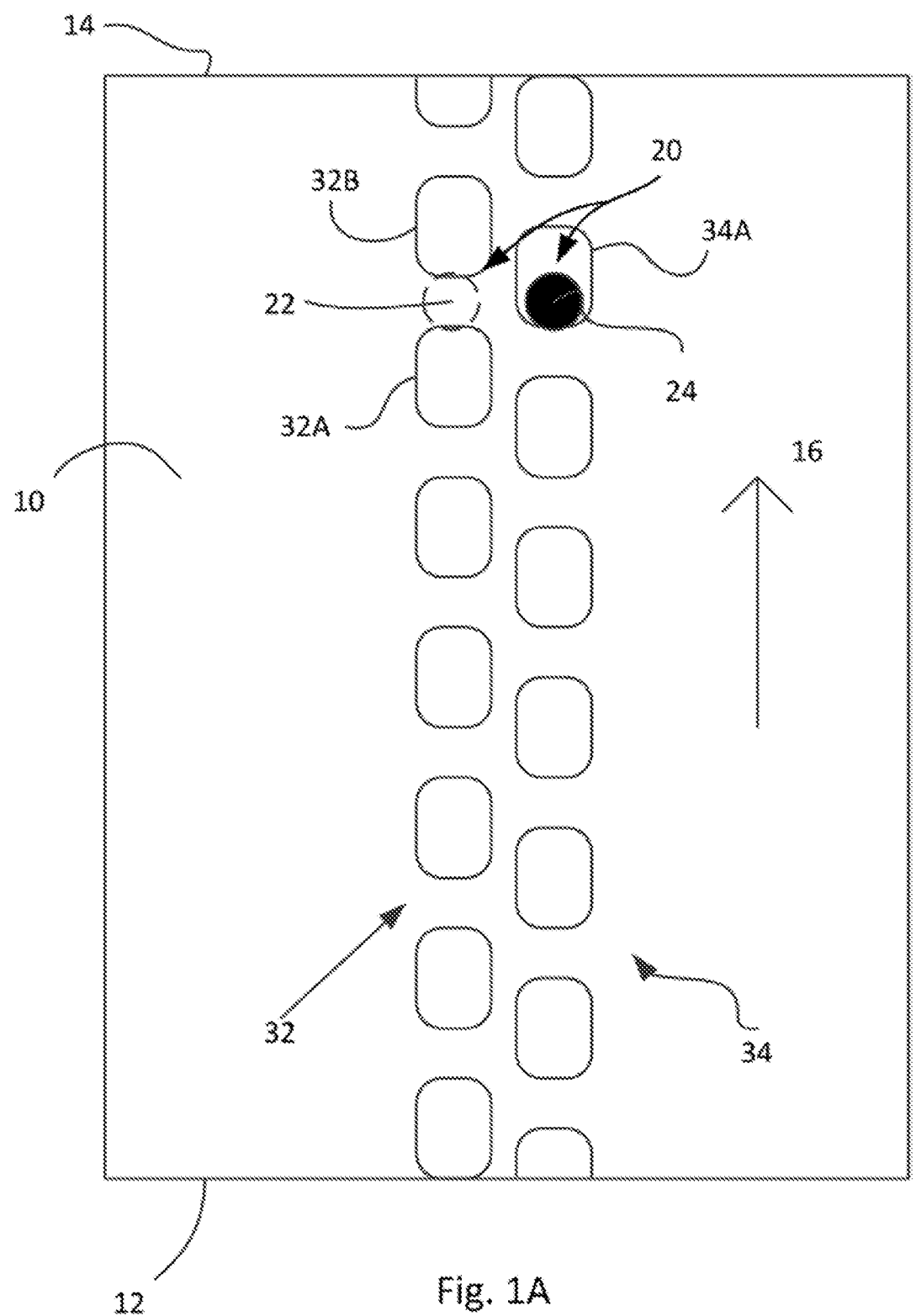
FIGS. 1A-1C are schematic drawings showing a top view of a conveyor according to an example.

FIG. 1A is a schematic drawing showing a top view of a conveyor according to an example. The conveyor of this example comprises a belt 10 for moving articles from a first end 12 to an opposite end 14 of the belt 10. In this case, the belt 10 is an endless belt 10, and a suitable driving mechanism may be used for driving the endless belt 10 and moving articles along the conveying direction 16.

A pair of rows of holes 32, 34 extending along the conveying direction 16 may be provided in the belt 10. In this example, the holes of a first row 32 are offset in the conveying direction with respect to the holes of second row 34. A pair 20 of sensors is provided. A sensor 22 is associated with the first row 32 of holes. Another sensor is associated with the second row 34 of holes. The sensors may be arranged underneath the belt 10 and in this example, the sensors are aligned with each other, i.e. they are in the same position along the conveying direction.

The rows 32, 34 of holes and the sensors 22, 24 associated therewith are arranged such that regardless of the position of the belt, at least one of the sensors 22, 24 is aligned with one of the holes. In the situation shown in FIG. 1A, the sensor 22 is not aligned with a hole, as it is positioned between holes 32A and 32B of the first row of holes. The sensor in this situation is thus aligned with material of the belt. The sensor 24 in this situation is aligned with hole 34A of the second row of holes.

Figure 1B:
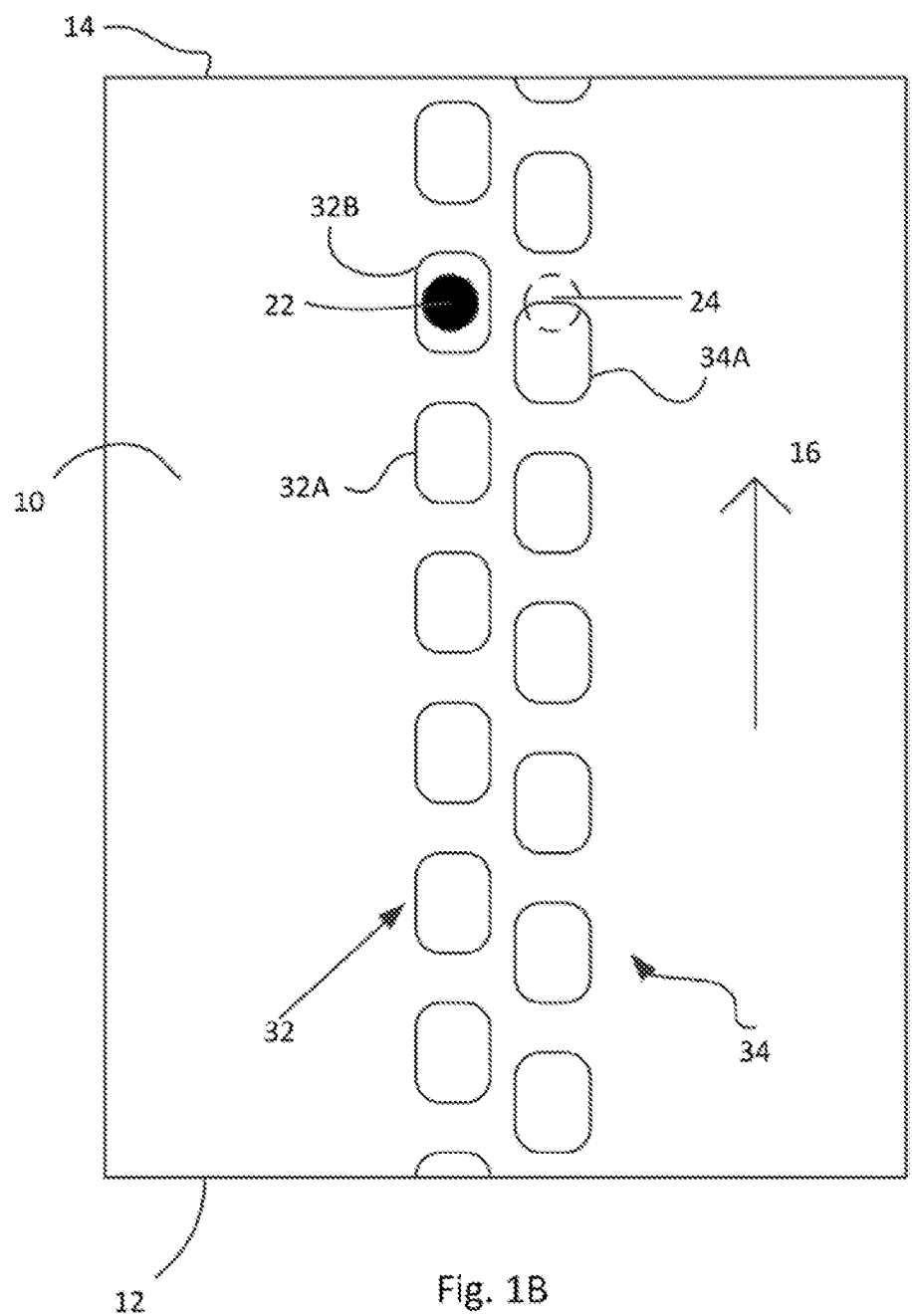
Figure 1C:
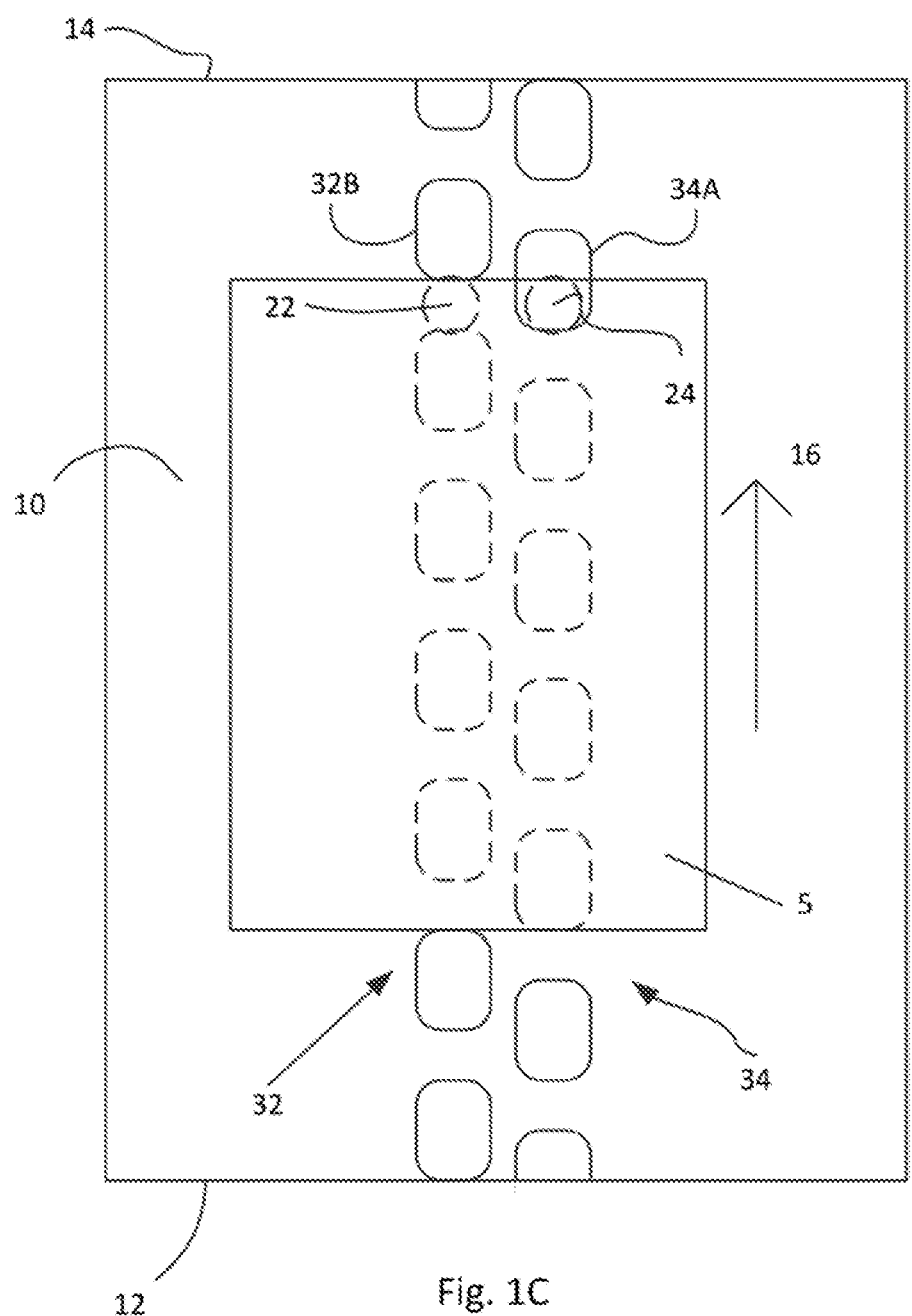

In a second situation, shown in FIG. 1B, the belt has moved slightly in the conveying direction as compared to the situation shown in FIG. 1A. When comparing FIG. 1B with FIG. 1A, one may see that the belt 10 has moved over the optical sensors in the conveying direction. In the situation shown in FIG. 1B, the sensor 24 is not aligned with a hole of the second row 34 of holes. On the other hand, the sensor 22 is aligned with a hole 32B of the first row of holes.

The same conveyor as shown in FIGS. 1A and 1B is also shown in FIG. 10. In FIG. 10, an article 5 is present on the belt 10. It may be seen in FIG. 10, that sensor 22 in this situation is not aligned with a hole and instead faces material of the belt 10. In the same situation, sensor 24 is aligned with hole 34A of the second row 34 of holes, but the sensor 24 now faces material of the article 5. With the arrangement according to this example, the presence of the article 5 may be reliably determined using a relatively simple control mechanism: when both sensors face material substantially simultaneously, an article is present. If no article is present, regardless of the position of the belt, at least one of the sensors is aligned with a hole and thus not covered with material.

Different types of sensors may be used depending e.g. on the material of the conveyor belt, and the type of article to be sensed. In some examples, optical sensors may be used. Such optical sensors may be configured to determine the presence of a material by reflection or interruption of a beam of light. When an optical sensor is aligned with a hole, and in the absence of an article, the light beam is not interrupted or not reflected.

In other examples, e.g. infrared, ultrasound, or magnetic, capacitive, or inductive proximity sensors could be used. The principle may be substantially the same: material is sensed when the sensors are aligned with a hole in the belt if there is an article on the conveyor belt.

Figure 1D:
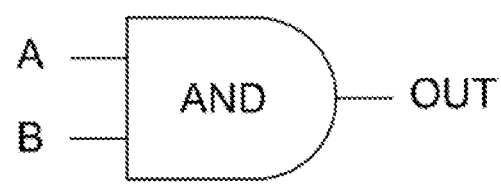
FIG. 1D depicts a logic AND gate.

A control for determining the presence of an article on the belt may be implemented with a logic AND gate, such as depicted in FIG. 1D. A signal from each of the optical sensors 22 and 24 may be connected at inputs A and B respectively. The input of each of the sensors may be "high", or a digital "1" if material is detected and the input of sensors may be "low" or a digital "0" if no material is detected. The output of a digital AND gate is a "1", if the inputs from both sensors is a "1", i.e. when both sensors detect material.

This control logic may be visualized in the following table:

| A (sensor 22) | B (sensor 24) | Output |
|---|---|---|
| 0 | 0 | 0 |
| 1 | 0 | 0 |
| 0 | 1 | 0 |
| 1 | 1 | 1 |

If no article is placed on the belt of the illustrated example, at all times, at least one of the sensors will be aligned with a hole, and thus at least one of the sensors will give a "0" input to the AND gate. The output of the AND gate will thus be a "0" as well. If an article is present, both sensors will give a "1" input, and the output of the controller will be a "1".

FIGS. 2A-2E are schematic drawings showing a top view of a conveyor according to different examples. The conveyor of the example of FIG. 2A substantially corresponds to the conveyor of FIGS. 1A-10. A single pair of rows of holes 32, 34 is provided. A single sensor is arranged with each of the rows 32, 34 and the sensors may be arranged underneath a portion of the belt 10 conveying an article. As explained before, in this example, regardless of a position of the belt 10 at least one of the sensors is aligned with a hole.

Figure 2A:
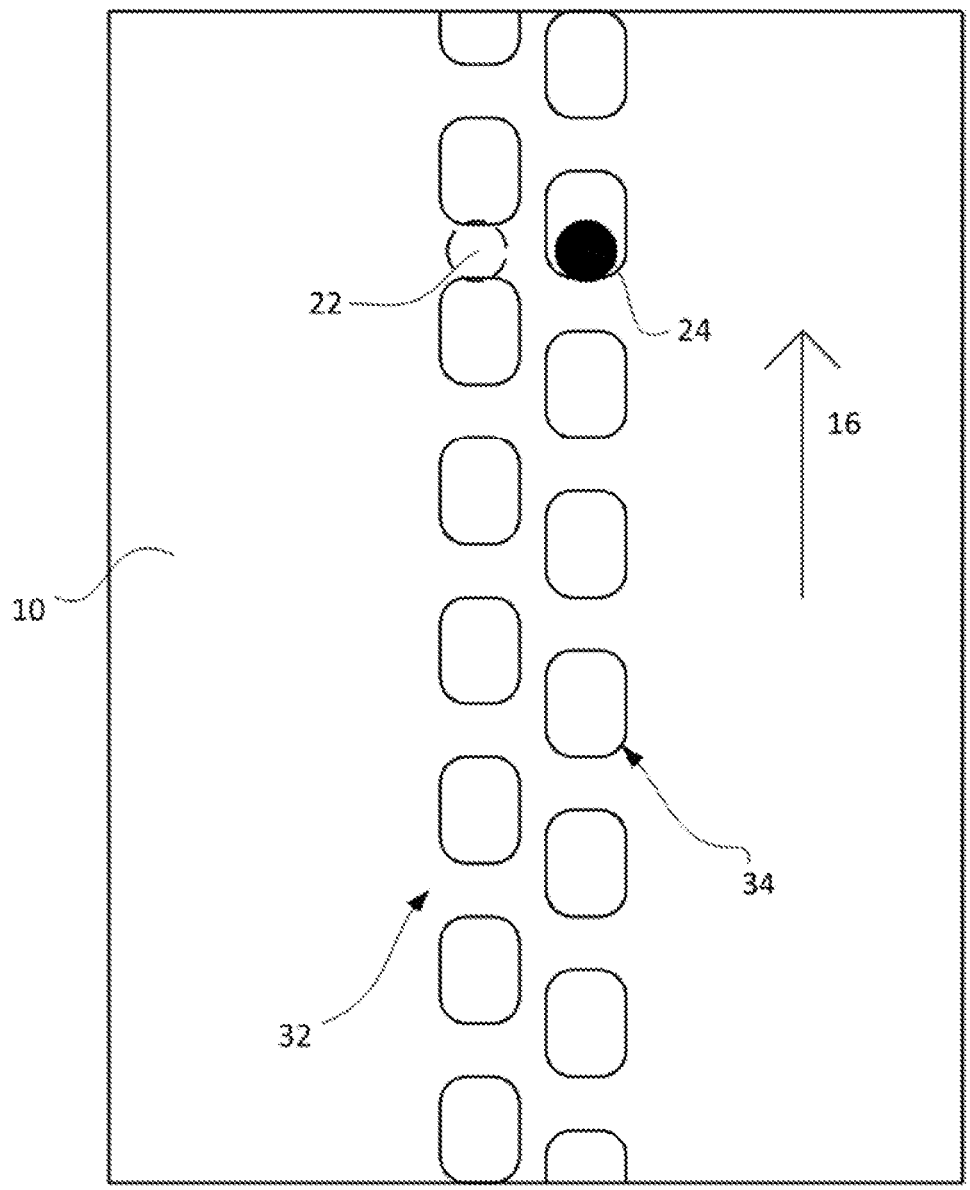
FIGS. 2A-2E are schematic drawings showing a top view of a conveyor according to various different examples.
Figure 2B:
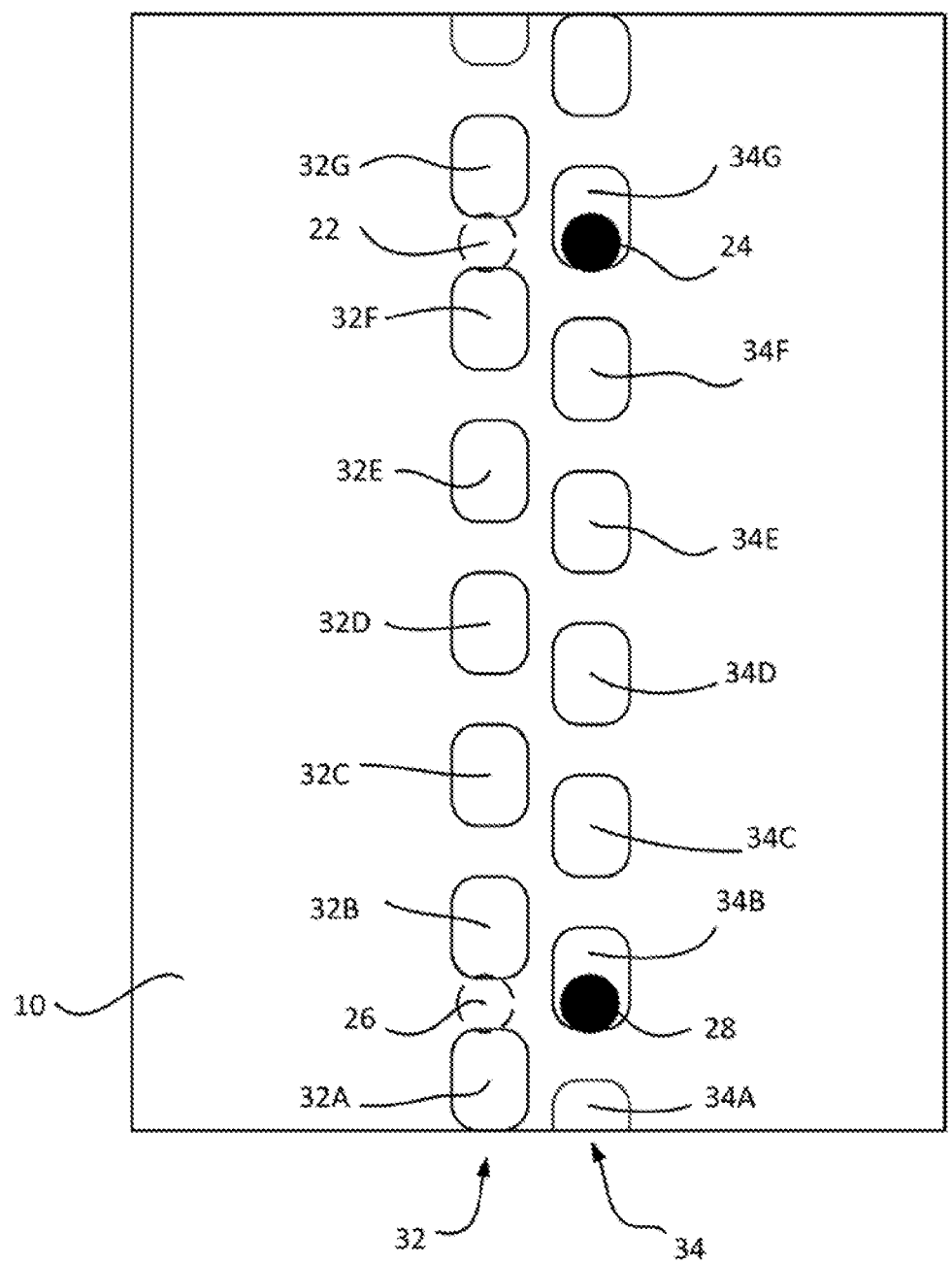

FIG. 2B shows another example of a conveyor. The example of FIG. 2B differs from the example of FIG. 2A in that a front sensor 22, 24 and a rear sensor 26, 28 are associated with each of the rows 32, 34. The front sensors are arranged downstream in a conveying direction from the rear sensors. The holes 32A-32G are offset in the conveying direction 16 with respect to holes 34A-34G, whereas the front sensors 22 and 24 are aligned with each other in the conveying direction, and also the rear sensors 26, 28 are aligned with each other in the conveying direction.

In examples wherein the distance between the front and rear sensors is larger than the length of articles being conveyed, the provision of a rear and front sensor for each of the rows makes it possible to determine whether the belt 10 has become displaced. If the front and rear sensors of both rows face material, this might not be caused by an article placed on the belt. Rather it may mean that the sensors are not aligned anymore with the rows of holes. This may indicate a displacement of the belt 10.

Sensing a displacement of the belt is also possible with the conveyor according to FIG. 2A. A control may be configured to determine a belt displacement if material is detected for too long. Such a control may be implemented in an example using a logic AND gate such as explained with reference to FIG. 1D and a timing circuit. In an example, at the moment that the output of the AND gate is "1", a timer may be started. The timer may be stopped at the moment that the AND gate is a "0". If the timer passes a predefined threshold (i.e. the sensors are covered by material for more than a predetermined period of time), displacement of the belt may be detected. The threshold may be derived from the maximum length of an article to be conveyed on the belt and the belt speed.

Generally, providing a plurality of sensors for each of the rows may make the determination of e.g. a length of an article possible. The length of an article may be derived or estimated by determining the optical sensors covered by material at the same time.

Figure 2C:
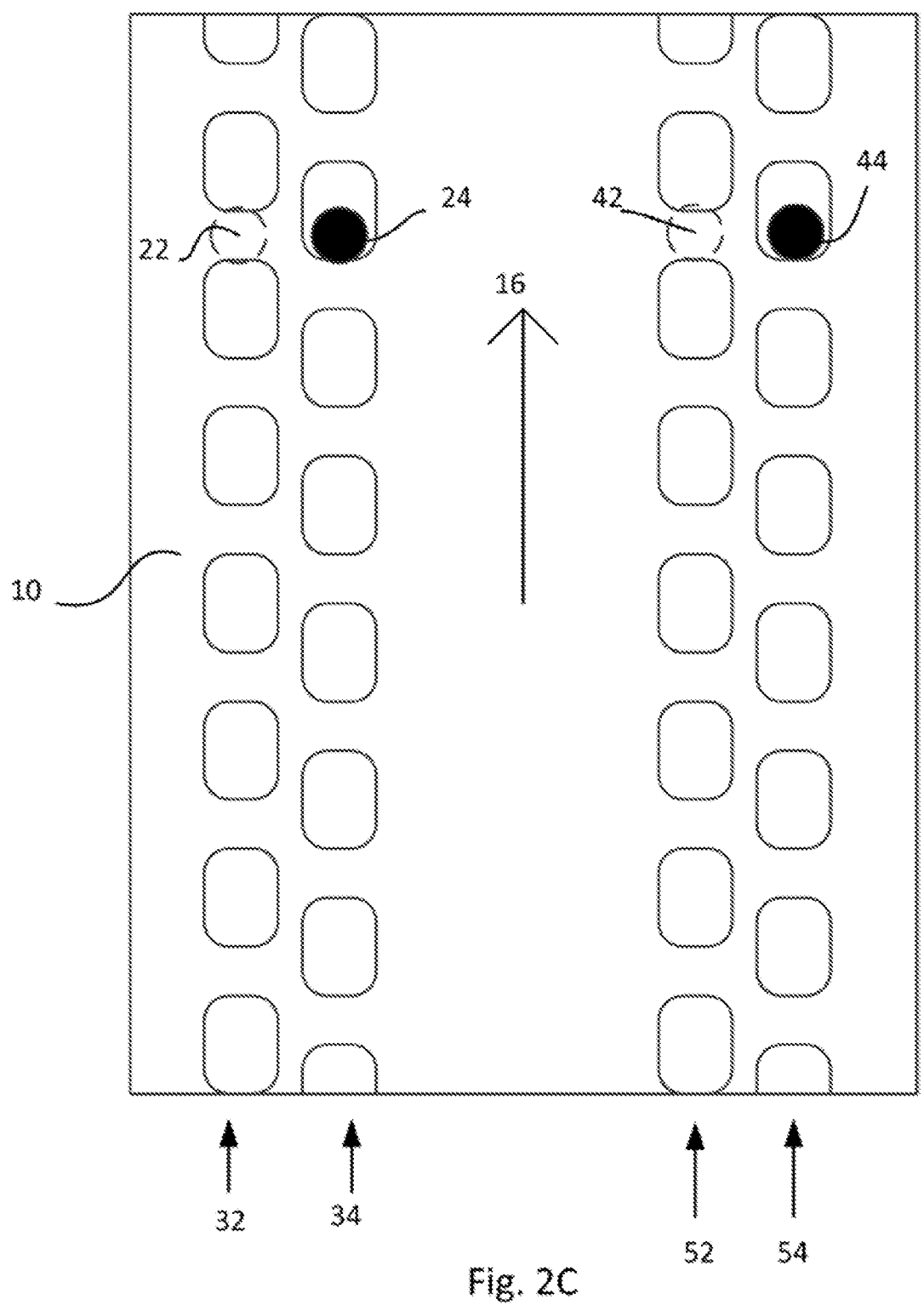

FIG. 2c shows yet a further example of a conveyor. In this example, two pairs of rows of holes are provided. A first pair of rows includes rows 32 and 34 of holes extending substantially along the conveying direction. A second pair of rows includes rows 52 and 54 of holes extending substantially along the conveying direction.

A sensor 22 is associated with the first row 32, and a sensor 24 is associated with row 34.

Providing two pairs of rows of holes allows determining not only a presence of an article on the belt 10, but also a possible skewness of the article. If an article is positioned substantially straight on the belt, the presence of the article is detected at substantially the same time e.g. by sensor 22 associated with the first row of the first pair of rows and sensor 42 associated with the first row of the second pair of rows. Similarly, presence of the article may also be detected substantially simultaneously the other pair of sensors 24 and 44 (sensor of the second rows of each of the pairs of rows).

Detecting skewness and the level of skewness may again be implemented using a first logic AND gates for the first pair of rows, and a second logic AND gate for the second pair of rows, in combination with a timing circuit. The difference in time between a "1" for the first AND gate and the second AND gate indicates the level of skewness, which may be calculated from the difference in time, the width of the article and the belt speed.

When a single pair of rows of holes is provided in the belt, such as e.g. in FIGS. 2A and 2B, such a pair of rows of holes may be positioned relatively close to a central area of the belt to ensure that they are provided in an area in which an article would be conveyed. When a double pair of rows of holes is provided in the belt, such as e.g. in FIG. 2C, a distance between the pairs of rows may be chosen such that an article to be conveyed would normally cover all rows.

Figure 2D:
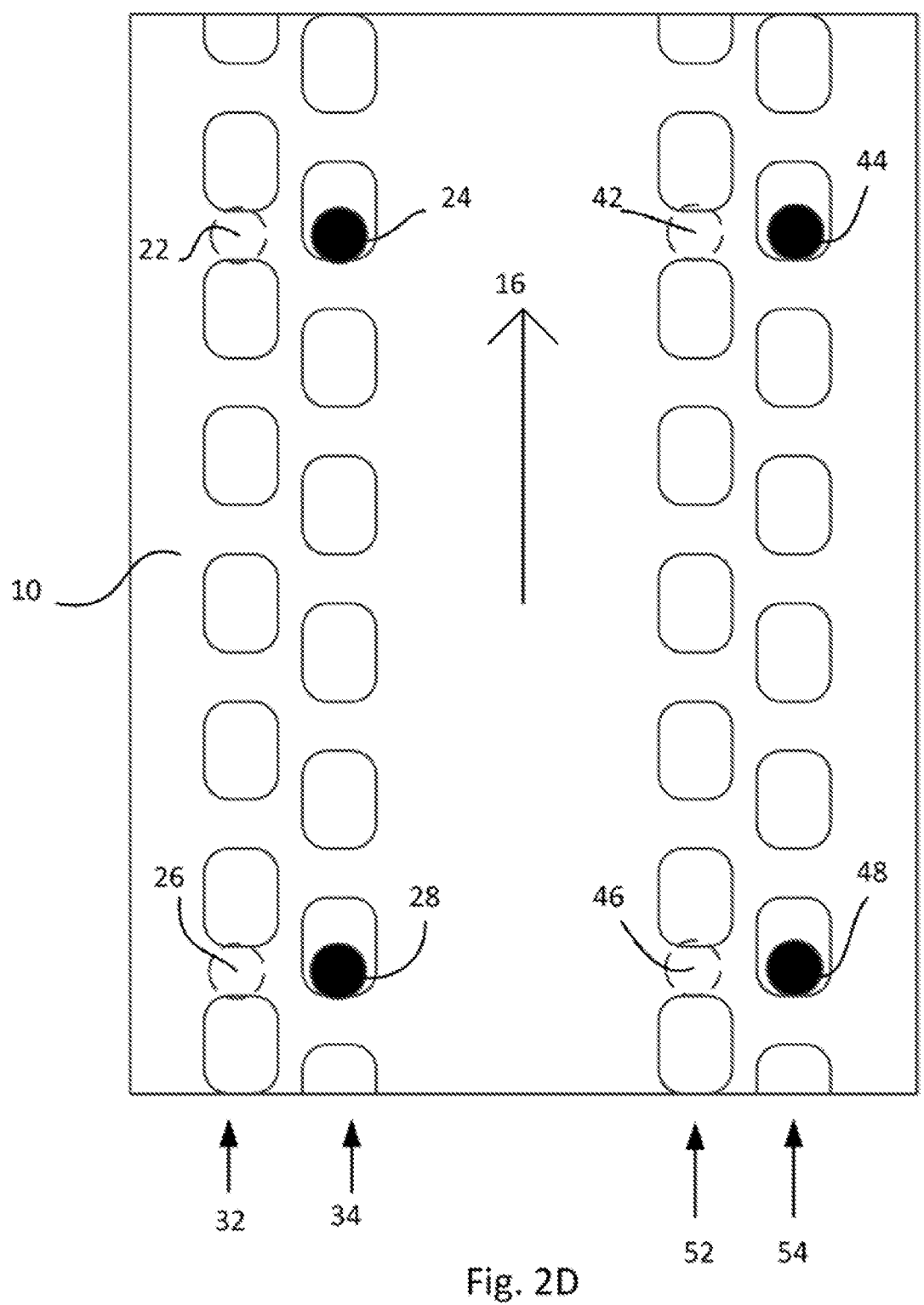

FIG. 2D schematically shows yet another example of a conveyor. The example of FIG. 2D is a conveyor having two pairs of rows of holes, such as shown in FIG. 2C. Additionally, a front and a rear sensor are associated with each of the rows, such as shown in FIG. 2B. The effects provided by this example correspond to the effects provided by each of the examples of FIGS. 2B and 2C.

Figure 2E:
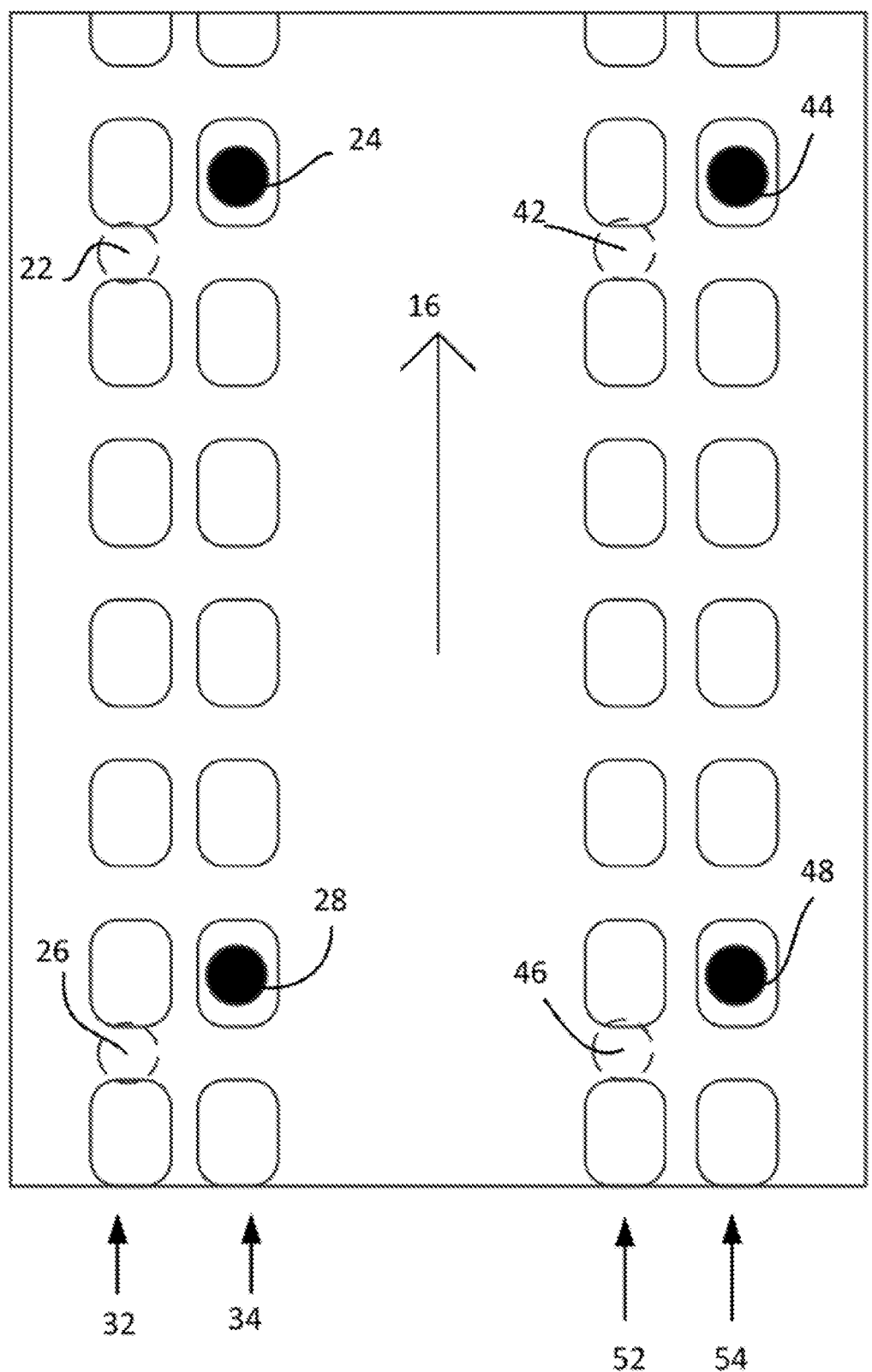

FIG. 2E schematically shows an alternative example of a conveyor. In the example of FIG. 2E, the conveyor comprises an endless belt having two pairs of rows of holes. The first pair of rows includes a first row 32 and a second row 34. The holes of the first row 32 are aligned with the holes of the second row 34. Similarly, the rows 52 and 54 of the second pair of rows are aligned.

The front sensor 22 associated with the first row 32 of the first pair is not aligned with the front sensor 24 associated with the second row 34. Similarly, the front sensor 42 associated with the first row 52 of the second pair is not aligned with the front sensor 44 associated with the second row. As may be seen in FIG. 2D, the same arrangement is shown for the rear sensors 26, 28 and 46 and 48.

The effect of the arrangement of the sensors and the pairs of rows of holes is similar as in the previous examples: an article is detectable when both sensors sense a material. In this example, regardless of the position of the belt, at least one of the sensors 22, 24 (or 26 and 28, 42 and 44 and 46 and 48) is aligned with a hole. The effects of providing two pairs of rows of holes, and the effects of providing a plurality of sensors for each row of holes are the same as described before with reference to the other examples.

Figure 3A:
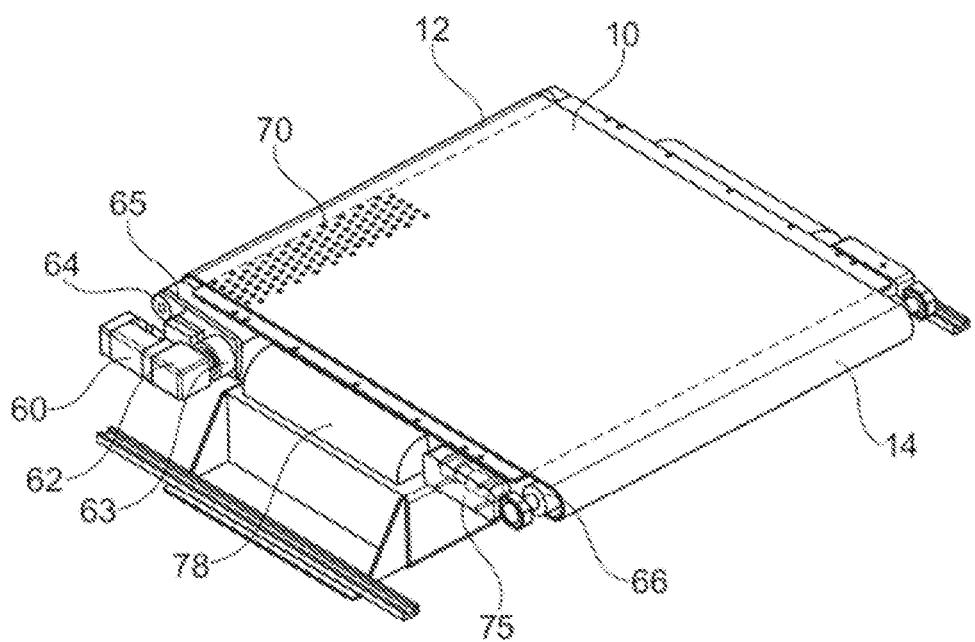
FIG. 3A is a schematic drawing showing a perspective view of a conveyor according to an example.

FIG. 3A is a schematic drawing of a perspective view of a conveyor according to another example. Such a conveyor may be used in a drying apparatus which may form part of a printing system.

Some printing technologies employ a pre-treatment of a print substrate, wherein a substrate coating or a priming treatment is applied prior to the application of a printing fluid, e.g. ink or toner.

This kind of treatment of a print substrate may be performed at a stage when a print medium or substrate is fed from a roll, e.g. before cutting operations. However, there are cases when a priming treatment is better applied to cut sheets of print media or substrate.

After a coating or primer has been applied to the print substrate, the print substrate may need to be dried. A drying apparatus as schematically shown in FIG. 3C may be employed. The drying apparatus of this example comprises an endless belt 10 which conveys sheets of print medium in a conveying direction 16.

Figure 3B:
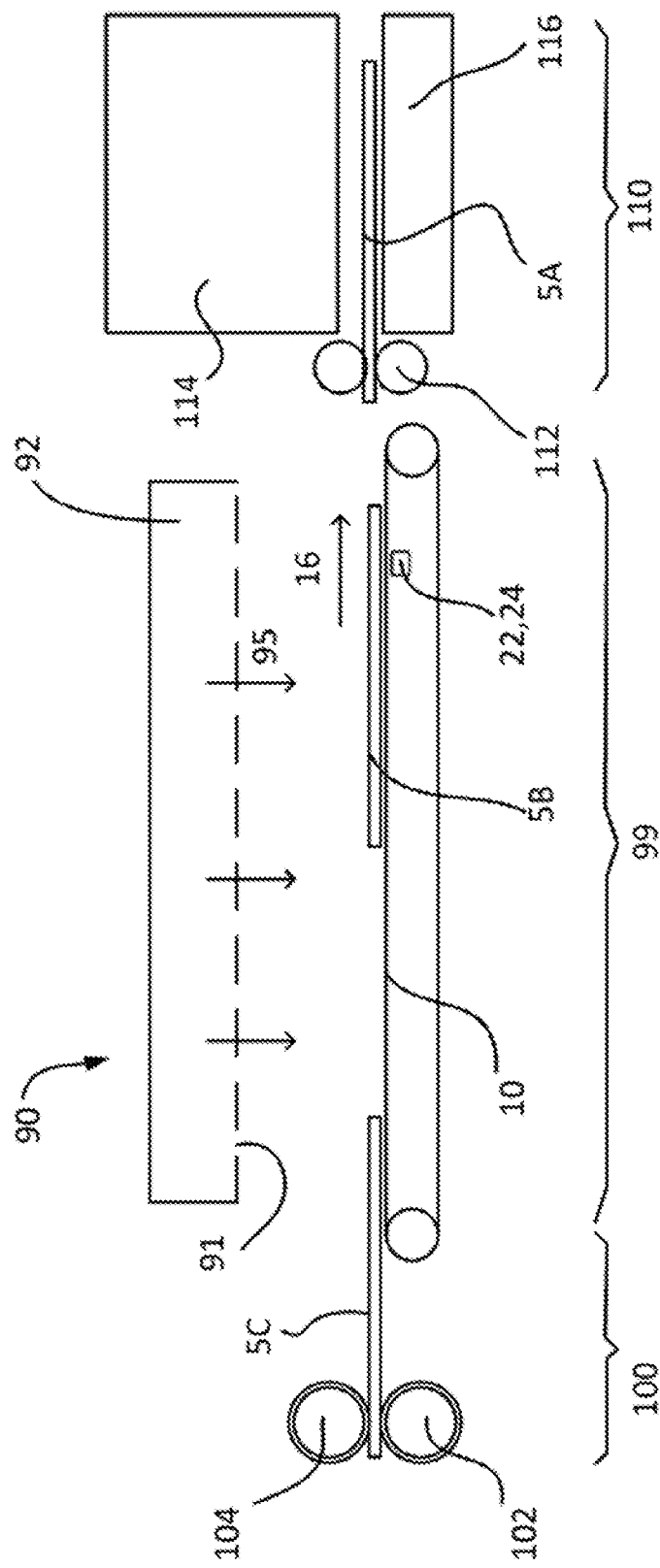
FIG. 3B is a schematic drawing showing a longitudinal cross-sectional view of an example of a printing system including the conveyor of FIG. 3A.
Figure 3C:
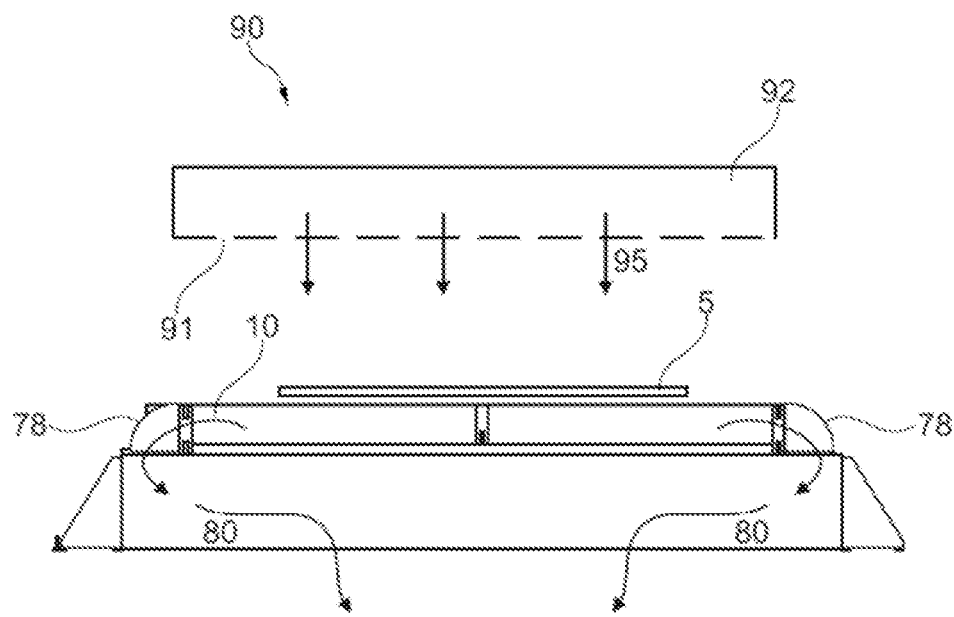
FIG. 3C is a schematic drawing showing a lateral cross-sectional view of the conveyor of FIG. 3A.

As schematically shown in FIG. 3B, a coating apparatus 100 may be provided for providing a coating on the print medium upstream from the conveyor. Print medium and in particular cut sheets of print medium may be deposited on the belt 10 at or near a first end 12 and conveyed towards an opposite end 14. Downstream from the conveyor, a printing apparatus 110 may be provided such that when the print medium has been dried, it can be used for printing.

The coating apparatus 100 may comprise one or more fluid transfer members 102 and 104 for transferring a coating, e.g. a priming fluid, onto a print medium. The fluid transfer members in some examples may be an anilox roller, optionally combined with a doctor blade.

A printing apparatus may comprise a plate 116, a print zone 114, and one or more rollers 112 for moving the print medium along a media advance path passing through the print zone.

In the example of FIG. 3B, several cut sheets of print medium are shown. A first sheet 5A is used in a printing process, and a second sheet 5B is in the drying apparatus for drying a coating that was previously applied. A third sheet 5C is still in the coating apparatus.

The endless belt of FIG. 3A is arranged around a driving pulley 64 and an idle driven conveyor roller 66. A motor 60 of this example actuates on a roller 63 through a gearbox 62. A driving belt 65 is arranged around the roller 63 and the driving pulley 64. The driving conveyor roller 64 in turn drives the endless belt 10.

Tensioners 75 may be provided to ensure that the endless belt 10 stays in place. The endless belt 10 in this example furthermore comprises a plurality of smaller holes 70. One or more suction mechanisms may be provided (not shown) to create an air flow through holes 70. Even though the smaller holes 70 are merely shown in a small area of the belt in FIG. 3A for reasons of clarity, substantially the whole surface of the belt may comprise such holes.

Air ducts 78 on either side of the endless belt conduct an air flow 80 caused by the suction mechanisms. By sucking the air from above the upper surface of the belt 10, a reduced pressure is created. Sheets of print medium conveyed on the belt may adhere better to the top surface of the belt due to the reduced pressure such that the sheets can be delivered to the printing apparatus while reducing the chances of a jam of the print medium.

Sensors 22, 24 are schematically indicated in FIG. 3B to be arranged underneath a portion of the belt conveying an article, in this case a print medium. In this example, a top loop of the belt conveys the print medium, and the sensors may be arranged between the top loop and the bottom loop. In this case, optical sensors that are arranged to face upwards to detect the print medium may be used.

Figure 3D:
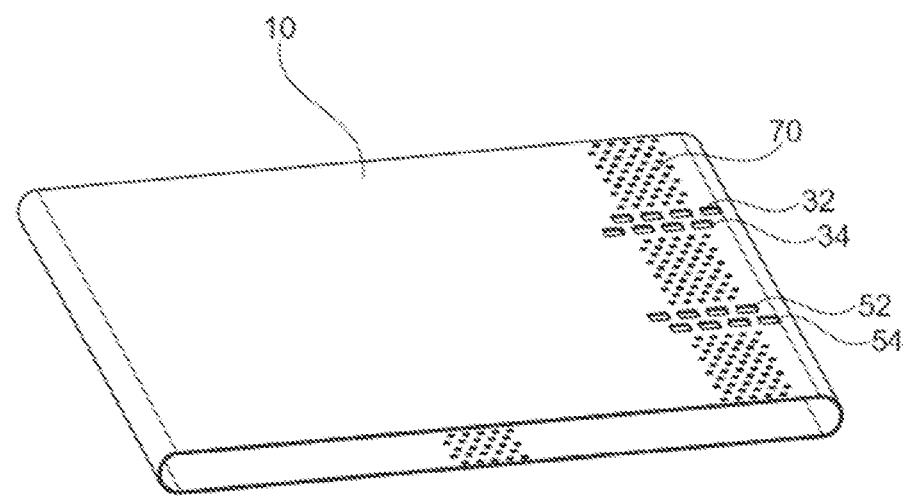
FIG. 3D is a schematic drawing showing another perspective view of the conveyor of FIG. 3A.

FIG. 3C shows a cross-section of the belt 10, the air ducts 78 and the air flow 80. FIG. 3D shows a further perspective view of the same belt 10. A first pair 32, 34 of rows of holes and a second pair 52, 54 of rows of holes is provided in the belt. Again, in FIG. 3D, merely some of the holes 32, 34, 52, 54 for sensing are shown for reasons of clarity of the figure.

The arrangement of optical sensors and rows of holes in this example may be similar to the arrangement shown in FIG. 2D. Such an arrangement enables sensing the arrival and departure of each of the sheets of print medium. A print process using the sheets of print medium may rely on this information for correct timing of the print process. The arrangement of holes and optical sensors furthermore enables determining skewness, if any, of the sheets. Such skewness may then be corrected if detected before the printing process.

Above the belt a plurality of dryers may be provided. In an example, the dryers may be air knives 90. In some examples, the air expelled onto the print medium may be heated. The air knives 90 may comprise a plenum 92 and air may be forced through a plurality of holes or slots 91 to create an air flow 95 impinging on the print medium.

FIGS. 3E-3H show different relative positions of the endless belt 10 with respect to the optical sensors 22, 24 arranged underneath the belt 10.

Figure 3E:
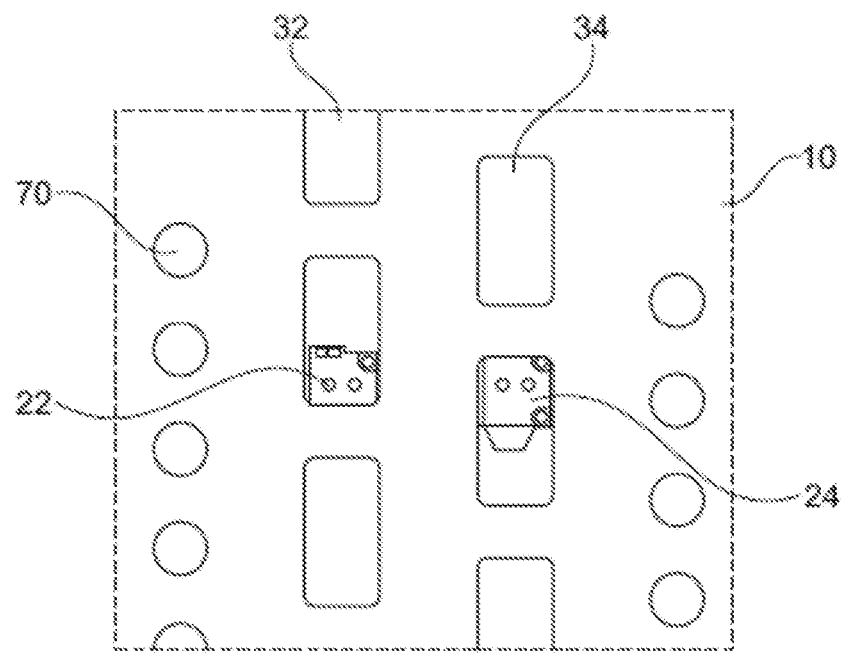
FIGS. 3E-3H are schematic drawings showing a top view of the conveyor of FIG. 3A.
Figure 3F:
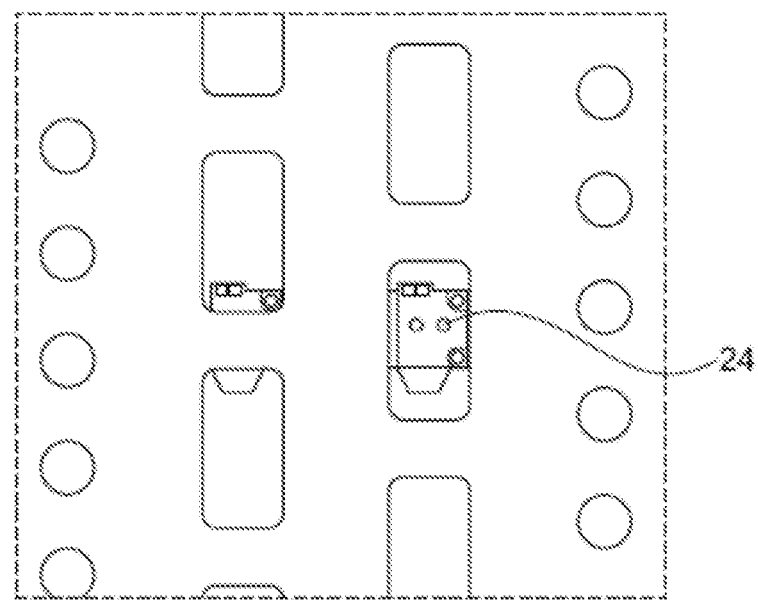
Figure 3G:
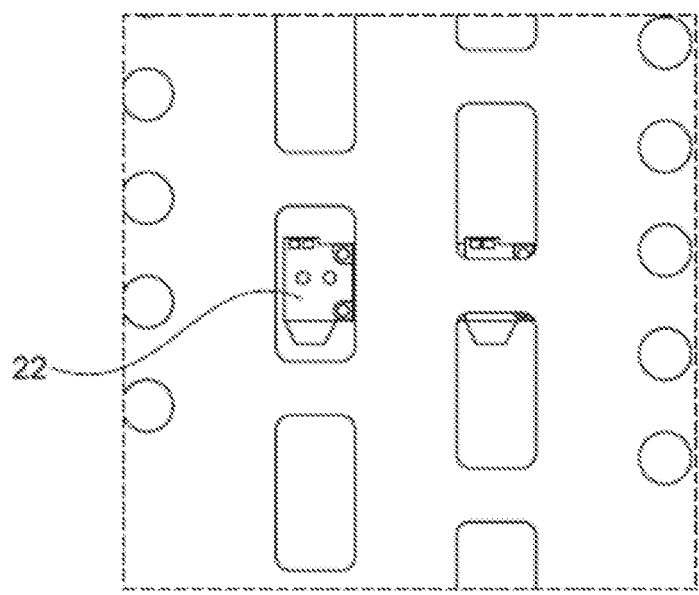
Figure 3H:
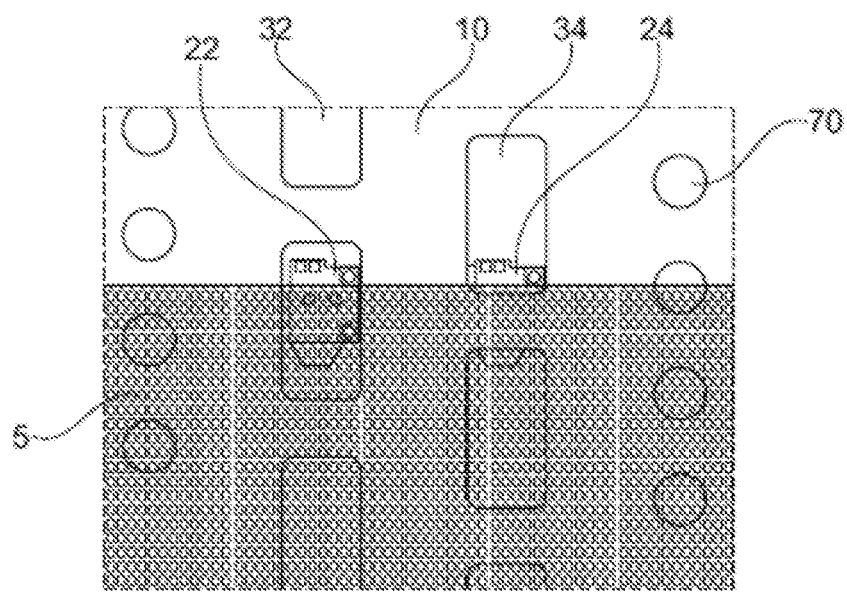

In the situation of FIG. 3E, each of the optical sensors 22, 24 is covered by a hole. No print medium is present in this situation. In the situation of FIG. 3F, optical sensor 24 is covered by a hole, whereas the optical sensor 22 is covered by belt 10. In the situation of FIG. 3G, optical sensor 22 is covered by a hole, whereas the optical sensor 24 is covered by the belt. Again, no print medium is present in either the situation of FIG. 3F or the situation of FIG. 3G.

If a print medium is present such as in FIG. 3G, are both optical sensors 22 and 24 covered by material. A controller may thus detect the presence of the print medium when both optical sensors are covered by material.

The size and shape of the holes, and the distance between the holes may be varied in accordance with circumstances. The shape of the holes may be chosen such that they can be easily manufactured, and the holes may be made wide enough that a relatively small misalignment in a direction transverse to the conveying direction does not hinder the proper functioning of the system.

The distance between the holes may be chosen so that regardless of the position of the belt, at least one of the optical sensors of a pair or sensors associated with a pair of rows faces a hole. In some examples, the holes may be such that regardless of the position of the belt, a single one of the optical sensors faces a hole.

Different kinds of optical sensors may be used in this specific example. For example, electro-optical sensors including e.g. photoelectric sensors may be used.

In any of the previous examples of FIGS. 1-3, different types of sensors suitable for sensing a material could be used.

In some of the previously described examples, reference was made to logic circuits to explain methods for detecting the presence, or position, or length and/or skewness of an article in a conveying system. The control logic in any of these examples may be implemented in machine readable instructions (e.g. software, firmware), hardware or combinations thereof.

The preceding description has been presented to illustrate and describe examples of the principles described. In certain Figures similar sets of reference numerals have been used to facilitate a comparison of similar and/or comparative features. This description is not intended to be exhaustive or to limit these principles to any precise form disclosed. It should be noted that certain described features may be extracted from the described examples and used independently to achieve an effect in a printing system. Moreover, omission, replacement and addition of features are envisaged. This may occur depending on particular factors of implementation. Many modifications and variations are possible in light of the above teaching

What is claimed is:
1. A conveyor comprising:
   a belt for moving an article along a conveying direction, the belt having a first pair of rows of holes extending along the conveying direction; and
   a sensor associated with each row of the first pair of rows, wherein the sensors and the first pair of rows of holes are arranged such that the article is detectable when both the sensors sense a material simultaneously, and wherein the sensors and the first pair of rows of holes are arranged such that for substantially any position of the belt in the conveying direction at least one of the sensors is aligned with one of the holes of the first pair of rows.

2. The conveyor according to claim 1, wherein the sensors are aligned with each other and the rows of holes of the first pair are offset from each other.

3. The conveyor according to claim 2, wherein a rear optical sensor and a front optical sensor are associated with each row of the first pair of rows of holes, and wherein the rear optical sensors are aligned with each other and the front optical sensors are aligned with each other.

4. The conveyor according to claim 1, wherein the belt has a second pair of rows of holes extending along the conveying direction, the conveyor further comprising:

a sensor associated with each row of the second pair of rows, wherein the sensors and the second pair of rows of holes are arranged such that for substantially any position of the belt along the conveying direction at least one of the sensors associated with each row of the second pair of rows is aligned with one of the holes of the second pair of rows of holes.

5. The conveyor according to claim 1, wherein the sensors are optical sensors.

6. The conveyor according to claim 1, wherein the article is conveyed on top of the belt, and the sensors are arranged underneath the belt.

7. A method of sensing in a conveyor that includes a conveyor belt comprising a first row of holes extending along a conveying direction, and a second row of holes extending along the conveying direction, a first sensor associated with the first row of holes and arranged under a portion of the belt conveying the article, and a second sensor associated with the second row of holes and arranged under the portion of the belt conveying the article, wherein the sensors and the first pair of rows of holes are arranged such that for substantially any position of the belt in the conveying direction at least one of the sensors is aligned with one of the holes of the first pair of rows, comprising:

determining a presence of the article on the conveyor belt when the first sensor associated with the first row of holes and the second sensor associated with the second row of holes sense substantially simultaneously a material covering the first sensor associated with the first row of holes and the second sensor associated with the second row of holes.

8. The method according to claim 7, further comprising determining a displacement of the conveyor belt if the first sensor associated with the first row of holes and the second sensor associated with the second row of holes sense a material covering the first sensor associated with the first row of holes and the second sensor associated with the second row of holes substantially simultaneously for more than a predetermined period of time.

\* \* \* \* \*